(12) United States Patent
Barker

(10) Patent No.: US 7,737,199 B2
(45) Date of Patent: Jun. 15, 2010

(54) TWO-COMPONENT ADHESIVE OF EPOXY RESIN/POLYOL PACK AND POLYAMIDE/ALIPHATIC AMINE/TERTIARY AMINE PACK

(75) Inventor: Michael J. Barker, Medina, OH (US)

(73) Assignee: Ashland Licensing & Intellectual Property LLC, Dublin, OH (US)

( * ) Notice: Subject to any disclaimer, the term of this patent is extended or adjusted under 35 U.S.C. 154(b) by 452 days.

(21) Appl. No.: 11/706,653

(22) Filed: Feb. 15, 2007

(65) Prior Publication Data

US 2008/0199717 A1 Aug. 21, 2008

(51) Int. Cl.
*C08K 3/36* (2006.01)
*C08L 63/02* (2006.01)

(52) U.S. Cl. .................. 523/467; 523/457; 523/458; 525/108; 525/113; 525/423

(58) Field of Classification Search ............. None
See application file for complete search history.

(56) References Cited

U.S. PATENT DOCUMENTS

| | | | | |
|---|---|---|---|---|
| 5,232,996 A | * | 8/1993 | Shah et al. ............. | 525/452 |
| 5,338,568 A | * | 8/1994 | Lohnes et al. .......... | 427/136 |
| 6,451,876 B1 | * | 9/2002 | Koshy ................. | 523/219 |
| 6,645,341 B1 | * | 11/2003 | Gordon ............... | 156/330 |
| 2005/0143496 A1 | * | 6/2005 | Mueller .............. | 523/400 |

* cited by examiner

*Primary Examiner*—Robert Sellers
(74) *Attorney, Agent, or Firm*—Mark A. Montana

(57) ABSTRACT

An epoxy adhesive composition of an epoxy resin, an epoxy terminated liquid rubber, filler, and an amine curing package for said epoxy resin is disclosed. Advantageously, a short chain diol will be incorporated into the adhesive in order to enhance reactivity and strength build. Advantageously, a mixture of amines will be used in the curative including multifunctional aliphatic amines that improve adhesion and strength build; tertiary amines which are used to enhance adhesion and strength build, polyamides which can be used to provide flexibility; and amine-terminated rubbers (ATBN) which can improve toughness and impact resistance to the cured system. The preferred short chain diol is glycerin. Surfaces of adherends are joined with the dried residue of the epoxy adhesive composition by applying the epoxy resin composition to one or both surfaces, joining the surfaces, and applying pressure, optionally with heating.

12 Claims, 2 Drawing Sheets

TWO-COMPONENT ADHESIVE OF EPOXY RESIN/POLYOL PACK AND POLYAMIDE/ALIPHATIC AMINE/TERTIARY AMINE PACK

CROSS-REFERENCE TO RELATED APPLICATIONS

This application is cross-referenced to common-assigned application of applicant Ser. No. 11/6539,539, filed on Dec. 15, 2006, the disclosure of which is expressly incorporated herein by reference.

STATEMENT REGARDING FEDERALLY SPONSORED RESEARCH

Not applicable.

BACKGROUND

The disclosure generally relates to epoxy adhesives and more particularly to a toughened epoxy adhesive with enhanced adhesion to sheet molding compound (SMC).

Sheet molding compound (SMC), for example, is defined (ASTM) as a molding compound in integral sheet form comprising a thermosetting resin, fibrous reinforcement, and additives required for processing or product performance, e.g., resin, catalyst, thickener, mold release agent, particulate filler, pigment, shrink control agent, etc. These materials and others generally are known as fiber-reinforced composites, reinforced composites, or simply composites. Due to their brittleness, traditional SMC's may micro-crack due to handling, flexing, etc., during and after molding. When those parts are painted, solvents used in the paint process can wick into the cracks and volatilize during the paint oven curing process. This volatilization pushes the paint off the substrate resulting in paint pops.

Recent developments in SMC technology for the automotive industry have resulted in improvements to the toughness of the SMC composites, resulting in reduced micro-cracking and, therefore, reduced paint pops and higher quality. Toughness refers to the resistance to cracking including higher elongation and increased area under the stress/strain curves. Past SMC composites have used brittle resins with high crosslink density to achieve the performance attributes needed for automotive applications. New SMC materials have been developed by increasing the elongation of the unsaturated polyester resins through a decrease in the crosslink density of the matrix resin. In addition, there can also be added improvements resulting from the inclusion of low Tg elastomeric toughening additives. This addition typically results in a 2-phase morphology that improves toughness through energy dissipation and crack stoppage mechanisms. These modification designed to increase toughness may result in a more difficult to bond to surface.

A common class of structural adhesives useful in adhering metal parts to the same and to different substrates (e.g. composites) is epoxy adhesives. Epoxy adhesive compositions most often contain a polyfunctional epoxy resin and are cured by addition of a curative, which typically is provided in a separate package, often referred to as Part A and Part B. The rate of cure and product characteristics are influenced by the choice of curing agent, which itself is influenced by the make-up of the adhesive composition, as dictated by the final properties desired by the user. Metal may include, but not be limited to, hot dipped galvanized steel, electro galvanized steel, e-coat steel, cold rolled steel, bare aluminum, anodized aluminum, etched aluminum, magnesium, etc.

Acceleration of two-part epoxy adhesives has taken many paths over the years, such as, for example, the use of acrylic esters, mercaptans, and hydroxyl groups. The acrylic esters produce a rapid reaction, but typically result in brittle-glassy polymers with low adhesion to SMC. The mercaptans also react vigorously, but result in brittle polymers with low adhesion and have a strong odor. The catalytic affect of hydroxyl groups was first reported by Shechter, et al., *Industrial Engineering and Chemistry*, Vol. 48, No. 1, pp. 94-97 (1956) where a termolecular mechanism was proposed. Phenol was cited as being far more efficient than aliphatic alcohols due to its relative acidity. U.S. Pat. No. 4,129,670 claims the use of dihydric phenols, such as catechol or resorcinol, as epoxy chain extenders that "may reduce the cure time and/or temperature". U.S. Pat. No. 5,385,990 claims the use of substituted aromatic phenols, where the substitution is an electron withdrawing group that causes an increase in the pKa value. This latter patent cites the previous work of U.S. Pat. No. 4,129,670 and, thus, excludes use of non-substituted aromatic phenols. Their preferred additive is p-chlorophenol, which is quite effective; however, it is plagued by an objectionable strong odor and recently chlorinated compounds, as a class, have been under scrutiny for being hazardous to the environment by such companies as Ford and Volvo.

U.S. Pat. No. 6,645,341 B1 claims a two-part epoxy that contains a polyester or polyether polyol at 10%-40% with a monomeric acrylic toughener and a curative consisting of polyoxyalkyleneamine, polyamide, reactive liquid rubber, amino functional silane, and tris(dimethylaminomethyl)phenol. The disclosed adhesive composition utilizes a polyol but at concentrations less than about 9.9% and does not use polyoxyalkyleneamine, acrylic monomer, or silane.

Additional representative epoxy structural adhesive compositions can be found in, for example, U.S. Pat. Nos. 2,977,332, 5,385,990, 6,645,341, 6,451,876, 5,001,193, 4,740,539, 6,486,256, and 6,572,971 and published application US2004/0197563A1, the disclosures of which are expressly incorporated herein by reference. Various combinations of epoxy resins, rubber modifiers, amine curing agents, amide curing agents, mercaptan curing agents, etc. have been proposed for formulating high strength adhesive compositions.

BRIEF SUMMARY

Disclosed is an adhesive composition of a mixture of epoxy resins, a short chain aliphatic polyhydric alcohol, filler, and an effective amount and combination of amine curing agents for said epoxy. Advantageously, a high molecular weight epoxy will be incorporated into the adhesive composition in order to improve sub-ambient impact strength and enhance substrate adhesion; short chain aliphatic polyols will be utilized to enhance wetting and reactivity. Advantageously a mixture of amines will be used in the curative including aliphatic amines, which effectively wet the substrate and provide multiple reactive sites for enhancing reactivity and adhesion; polyamides which provide flexibility and allow for improved ratio tolerances of the adhesive system; aromatic tertiary amines that will be used to enhance reactivity and improve adhesion and amine terminated rubbers, ATBN, which can improve toughness and impact resistance. Surfaces of adherends are joined with the dried residue of the epoxy adhesive composition by applying the epoxy resin composition to one or both surfaces, joining the surfaces, and applying pressure, optionally with heating. The joined adherends having the dried epoxy resin composition is another disclosed embodiment.

The result is a novel combination of ingredients providing a unique set of desirable properties such as, for example, enhanced reactivity, good adhesion and desirable fiber tear failure pattern to toughened class A SMC in wedge peel, lap shear at 29° C., 22° C. and 82° C., humidity, water soak, salt spray and thermal soak resistance. Through use of aromatic-ring-containing aliphatic tertiary amine and multifunctional aliphatic amine with short chain aliphatic polyol, the enhanced reactivity and adhesion is obtained without the level of glassy embrittlement typically observed with fast reacting epoxy adhesives. This combination of properties is desirable for vehicle assembly in the transportation industry.

BRIEF DESCRIPTION OF THE DRAWINGS

For a more complete understanding of the nature and advantages of the present invention, reference should be had to the following detailed description taken in connection with the accompanying drawings, in which.

Figure 1:
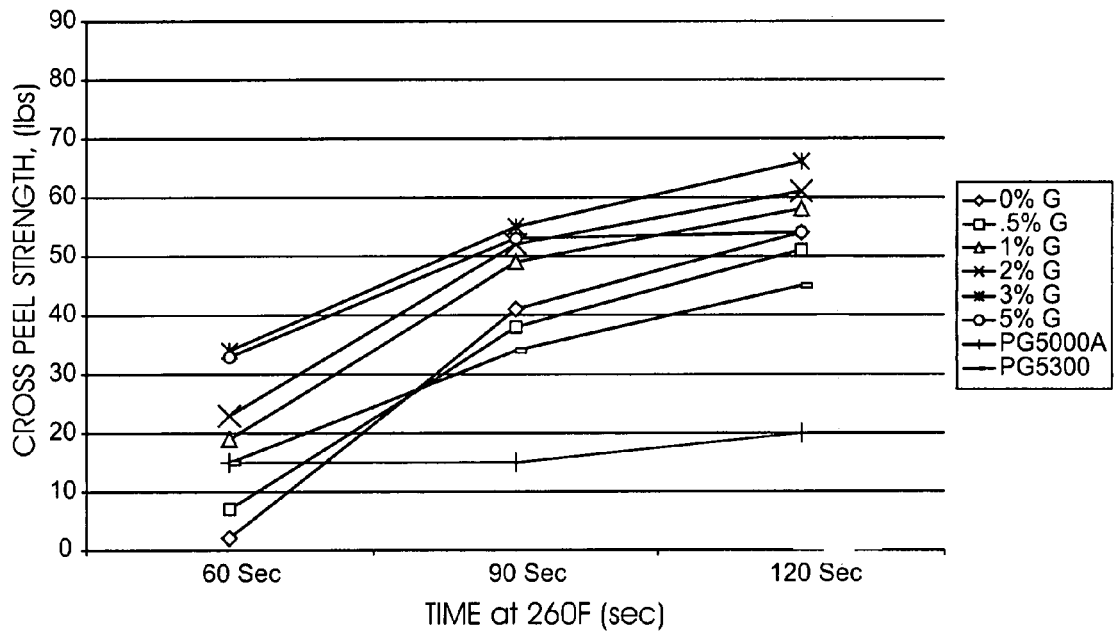
FIG. 1 displays the effects of an aliphatic short chain polyol, e.g., glycerin, in the presence of both aliphatic and aromatic tertiary amines, as reported in Example 6, by plotting cross peel strength versus time.

The drawings will be described in greater detail below.

DETAILED DESCRIPTION

Adhesive reaction rate and strength build are as important as substrate adhesion when building a successful adhesive bonding assembly line. Minimizing production cycle time, or maximizing the number of parts produced per hour, is a key driver to creating acceptable economics for any assembly line. Cross peel strength versus time is an effective tool to model the adhesives behavior at the moment a production tool opens its clamps to release a hot bonded component. At this point the adhesive must demonstrate enough strength to hold the bonded components together and maintain dimensional tolerances. Cross peel involves overlaping a pair of one-by-three inch SMC coupons to form a cross with the adhesive between the overlap. The sample, then, is seated in a heated fixture for a preset time and peeled apart while still hot. This test yields a relative comparison of the adhesive strength versus time and, thus, the relative state of adhesive cure.

Substrate technology in the transportation industry is an ever evolving specialty product. As the consumers needs change so does the substrate to fill the requirements. The recent discovery that SMC microcracking is directly corellated to paint pops has led to the development of toughened SMC to counteract the affect. As a result of the these changes, the relative surface energy of the composit may change resulting in the need to modify associated surface coatings and adhesives to maintain good adhesion. Early evaluations of commercial two-part epoxy adhesive demonstrated the need to modify the technology to optimize adhesion to the new class of substrates.

Research directed at evaluating individual components of the commercial systems isolated ingredients providing both positive and negative contributing factors for adhesion. Efforts to enhance adhesion, while maximizing the rate of strength build, isolated a combination of ingredients providing superior performance. The combination of aromatic-ring containing tertiary amine, multifunctional aliphatic amine, and short chain polyol within a curative solution of polyamide and liquid rubber, provided excellent adhesion and strength build without the level of glassy embrittlement typically observed with fast reacting epoxy adhesives. The result is a two-part epoxy capabled of generating about a 60 to about a 90 second cure cycle at 127° C. with an approximately 50 minute open time, low odor, and good adhesion to toughened SMC. This combination of ingredients and properties is desireable for vehicle assembly in the transportation industry and has not been taught in the prior art.

Referring initially to the epoxy resin, a variety of monomeric and polymeric compounds or mixtures of compounds having an epoxy equivalency equal to or greater than 1 (i.e., wherein the average number of epoxy groups per molecule is 1 or more) can be used in formulating the inventive adhesives. Epoxy compounds are well-known as the art cited above details and which is expressly incorporated herein by reference. Useful epoxy compounds include, for example, but not limited to, polyglycidyl ethers of polyhydric polyols, such as ethylene glycol, cyclohexane dimethanol, triethylene glycol, 1,2-propylene glycol, 1,5-pentanediol, 1,2,6-hexanetriol, glycerol, and 2,2-bis(4-hydroxy cyclohexyl)propane; polyglycidyl ethers of aliphatic and aromatic polycarboxylic acids, such as, for example, but not limited to, oxalic acid, succinic acid, glutaric acid, terephthalic acid, 2,6-napthalene dicarboxylic acid, and dimerized linoleic acid; polyglycidyl ethers of polyphenols, such as, for example, but not limited to, bisphenol A, bisphenol F, 1,1-bis(4-hydroxy phenyl)ethane, 1,1-bis(4-hydroxy phenyl)isobutane, and 1,5-dihydroxy napthalene; modified epoxy resins with acrylate or urethane moieties; glycidylamine epoxy resins; and novolak resins; and the like and mixtures thereof.

The foregoing epoxy resins may be augmented with modified epoxy resins in the form of epoxy-rubber adducts. Such adducts are well known and include epoxy compounds reacted with liquid or solid butadiene-(meth)acrylonitrile copolymers having at least two groups which are reactive with epoxy groups, including, for example, but not limited to, carboxyl, hydroxyl, mercapto, and amino. Such functional elastomeric copolymers having functional groups are well-known articles of commerce and need not be discussed in greater detail herein.

Referring now to the hardener, such hardener or curing agent comprises various aliphatic polyamines, polyamidoamines, alicyclic polyamines, tertiary amines, and various mixtures thereof that may be used. Examples of amine hardeners include, but are not limited to, one or more of ethylenediamine, diethylenetriamine, triethylenetetramine, tetraethylenepentamine, 2-methyl-1,5-pentanediamine, pentaethylenehexamine, hexamethylenediamine, trimethyl-1,6-hexanediamine, polyetherdiamine, diethylaminopropylamine, oleylamine, isophorone diamine, diethanolamine, triethanolamine, m-xylenediamine, diaminodiphenylsulfone, bis(aminopropyl)piperazine, and N-aminoethylpiperazine, and the like.

In order to obtain high flexibility, toughness and improved water stability, polyamides may be used, such as those resulting from the reaction of aliphatic polyamines, with polymeric unsaturated higher fatty acids selected from the class consisting of dimerized unsaturated higher fatty acid and unsaturated trimerized higher fatty acids and their associated imidazolines. These materials may be obtained from commercials sources, i.e., Versamid 140 (the reaction product of dimerized linoleic acid with aliphatic primary amines).

Tertiary amines include, as classes, but not limited to, pyrroles, pyridines, pyrazines, pyrimidines, purines, benzimidazoles, quinolines, imidazoles and Mannich bases. Examples of the Mannich bases include, but not limited to, one or more of tris(dimethyl)aminoethylphenol, tris(dimethyl)aminomethyphenol, dimethylaminomethylphenol, 4,4'-dihydroxy-3,5,3',5'-tetra(dimethylaminomethyl)-phenyl-dimethyl methane and those derived from a phenol and having at least one tertiary amino group selected from the class consisting of dialkylamino, dihydroxyalkylamino, diarylamino, dihyroxyarylamino, piperidino and morpholino groups and a least one phenolic hydroxyl group and the like. Imidazoles include, for example, but not limited to, one or more of 2-ethyl-4-methyl imidazole, methyl imidazole, imidazole, 2,4-diamino-6(2'-methylimidazolyl-(1')) ethyl-S-triazine isocyanurate, 2,4-diamino-6(2'-methylimidazolyl-(1')) ethyl-S-triazine, 2-heptadecylimidazole, and the like Suitable aliphatic polyhydric alcohols, (polyols), are those containing from 2 to about 15 carbon atoms and bearing from two to about ten hydroxyl functionality groups. Examples of acceptable polyhydric alcohols include, for example, but not limited to, one or more of ethylene glycol, 1,2-propylene glycol, 1,3-propylene glycol, glycerol, dipropylene glycol, tripropylene glycol, 2-methyl-1,3-propanediol, pentaerythritol, trimethylopropane, 1,4,6-octanetriol, butanediol, pentanediol, hexanediol, dodecanediol, octanediol, chloropentanediol, glycerol monoethyl ether, diethylene glycol, 2-ethylhexanediol, 1,4-cyclohexanediol, 1,2,6-hexanetriol, 1,3,5-hexanetriol, 1,3-bis-(2-hydroxyethoxy)propane or the like.

Optional ingredients in the adhesive composition include, for example, coupling agents such as silane, acrylic phosphate esters, phosphate esters, titanates and the like, particulate and reinforcing fillers and thixotropic agents, tinctorial pigments, opacifying pigments (e.g., $TiO_2$), and like conventional additives. Fillers are utilized in the adhesive to help maintain viscosity, improve sag resistance, and provide reinforcement to the final cured material, as well as reduce the final cost of the product. Useful fillers include, for example, but not limited to, Kevlar®, kaolin, talc, mica, bentone clay, calcium carbonate, any of the alkaline earth inorganic salts, metals such as powdered aluminum or iron, metal oxides such as ferric oxide or aluminum oxide, silica, hollow glass spheres, ceramic beads such as those available under the trademark Zeeospheres from Zeelan Industries, Inc., or any other filler (and mixtures thereof) well-known to those skilled in the art of formulating adhesives. Filler particle size may vary from the nano to the micron range.

The disclosed adhesive is particularly well adapted for use on a variety of fiber-reinforced composites, including, for example, sheet molding compound (SMC) substrates. Among the fiberglass reinforced polyester substrates useful herein are those provided by Ashland Performance Materials, Dublin, Ohio (Phase β, Phase δ, Phase ε, 346, 346IF), GenCorp, Marion, Ind. (GC-7113, GC-8002 and GC-7101 substrates), Rockwell International Corporation, Centralia, Ill. (RW 9468 Substrate), Continental Plastics, Madison Heights, Mich. (DSM 950, 971 and 951 Substrate) and Eagle Picher Plastics, Grabill, Ind. (EP SLI-213 Substrate), and the like. Car and truck body parts made of sheet molding compound (SMC) also are adhered using the fast cure structural urethane adhesives and can now be adhered using the disclosed two part epoxy adhesive.

The disclosed adhesive also can be used to join metal. Metals include, for example, hot dipped galvanized steel, electro galvanized steel, e-coat steel, cold rolled steel, bare aluminum, anodized aluminum, etched aluminum, magnesium, and the like.

For SMC or metal uses, the adhesive composition preferably is applied robotically by extrusion through a follower plate or manually with a side by side cartridge, through a static or dynamic mix tube, though it may be diluted in appropriate solvent, such as, for example, methylethylketone, and applied by conventional roller coating, both direct and indirect, spray application, dip application, side-by-side cartridge, or any application technique that is necessary, desirable, or convenient. No priming of the composite or metal substrate is required when using the inventive adhesive. The parts then are joined under pressure at ambient temperature or, optionally, elevated temperatures (i.e., greater than 22° C.) to facilitate cure.

While the invention has been described and illustrated in connection with certain preferred embodiments thereof, it will be apparent to those skilled in the art that the invention is not limited thereto. Accordingly, it is intended that the appended claims cover all modifications, which are within the spirit and scope of this invention. All references cited herein are expressly incorporated herein by reference.

The following examples show how the invention has been practiced, but should not be construed as limiting. In this application, all percentages and proportions are by weight and all units are in the metric system, unless otherwise expressly indicated.

EXAMPLES

| List of Raw Materials | |
|---|---|
| | Description |
| Epoxy Resin Components | |
| Epon 834 | Epoxy Resin Diglycidyl ether of bisphenol A, EEW = 260, (higher molecular weight epoxy than standard), available from Hexion Specialty Chemical. |
| Epon 828 | Epoxy Resin Diglycidyl ether of bisphenol A, EEW = 189, (standard epoxy resin), available from Hexion Specialty Chemical. |
| Epon 58006 | ABA Block copolymer with B = carboxyl terminated butadiene nitrile rubber, CTBN, (acrylonitrile content = 18%, Tg = −52 C.), and A = Epon 828 epoxy resin, available from Hexion Specialty Chemical |

-continued

List of Raw Materials

| | Description |
|---|---|
| Epon 58042 | ABA Block copolymer with B = carboxyl terminated butadiene nitrile rubber, CTBN, (acrylonitrile content 26%, Tg = −39 C.), and A = digylcidyl ether of cyclohexane dimethanol, available from Hexion Specialty Chemical |
| Heloxy 505 | Polyglycidyl ether of castor oil, available from Hexion Specialty Chemical. |
| Mistron RSC Talc | Hydrous magnesium silicate, available from Cyprus Industrial Minerals |
| Winofil SPM | Fatty acid coated precipitated calcium carbonate, available from Zeneca Resins. |
| Cab-O-Sil TS-720 | Silicone oil treated synthetic hydrophobic silicon dioxide, "fumed silica", available from Cabot Corporation. |
| Glycerin | Short chain polyol, available from Aldrich. |
| Amine Components | |
| Ancamid 350A | Polyamide resin based on dimerized fatty acid and polyamines, AHEW = 100, available from Air Products |
| Versamid 140 | Polyamide resin based on dimerized fatty acid and polyamines, AHEW = 97, available from Cognis |
| ATBNX42 | 2-methylpentamethylene diamine terminated butadiene acrylonitrile liquid rubber, (acrylonitrile content = 18%, Tg = −59° C., AHEW = 225), available from Emerald L.C.C. |
| AEP | Aminoethyl-piperazine, unmodified aliphatic amine, AHEW = 43, available from Air Products |
| TETA | Triethylenetetramine, unmodified aliphatic amine, AHEW = 27, available from Air Products |
| D230 | Polyoxypropylene amine, AHEW = 60, available from Jeffamine |
| Stan-tone 29746 | Carbon black pigment dispersed in TETA, available from PolyOne |
| 5A Sieves | Five angstrom molecular sieve adsorbent powder, available from UOP |
| K54 | 2,4,6-Tri(dimethyl aminomethyl) phenol, tertiary amine, amine value 630, available from Air Products |
| Cab-O-Sil TS-720 | Silicone oil treated synthetic hydrophobic silicon dioxide, "fumed silica", available from Cabot Corporation |
| Q-Cell 6042S | Hollow glass spheres, available from Potters Industries |

Substrate

The primary toughened sheet molding compounds (SMC) used in this investigation were 346 obtained from Composite Polymers Division of Ashland, Inc. (Dublin, Ohio) and 8332 available from Meridian Automotive Industries.

Alternate SMC used in this study was 7350-180E a toughened and powder prime capable substrate, also obtained from Ashland, Inc The technology is adaptable to sundry other substrates such as metal, thermoplastic, and thermoset materials.

General Definitions

| | |
|---|---|
| Part A | Refers to the epoxy resin side |
| Part B | Refers to the amine based curative side |
| FT | 100% Fiber Tear in substrate |
| Ad | Adhesive Type Failure |
| SB | Stock Break |
| Co | Cohesive Failure in Adhesive |
| Example, 70FTCO | States sample failed with 70% FT and the remainder Co |

Adhesive Compounding

The adhesive formulations were prepared by simple blending at elevated temperature. The individual mixtures were prepared in a 2000 ml resin kettle capped with a three-neck lid. One neck was fitted with a high-shear mixing blade; the other two acted as inlet and outlet for vacuum and argon purge. The part A or epoxy side was prepared by adding the appropriate epoxy resins and epoxy terminated rubber and heating to 88° C. under full vacuum of 30 inches Hg and moderate mixing to remove all gas from the system. Next, while maintaining temperature, the talc and calcium carbonate fillers were added and mixed with high shear under full vacuum for 30 minutes. The fumed silica then was incorporated with high shear and vacuum until a uniform, smooth, glossy mixture was obtained. Finally, if used, the short chain polyol was added last and again mixed under high shear and vacuum for 30 minutes. The final product was poured into dry glass jars and purged with argon.

For the part B or amine side, the resins were added to a resin kettle and heated to 60° C. and fully degassed under vacuum and low shear mixing before further additions were made. The calcium carbonate and molecular sieves then may be added with high shear mixing and vacuum to fully de-agglomerate the powders prior to adding the fumed silica. Finally, the system is mixed under full vacuum until a uniform, smooth, glossy appearance is obtained. Product was then stored in glass jars purged with argon until use.

Mixing A and B Components

One laboratory method to prepare the mixture is to measure the proper amounts of A and B components into a 200 ml cup and mix for two minutes at 2500 RPM in a Speedmixer™ DAC 400 FVZ mix system. Alternatively and more preferred is to load the A and B components individually and separately into side by side cartridges and pump through a static mix tube to achieve complete mixing. The product then is applied from the mix tube or cup directly onto the appropriate substrate.

Construction of Test Samples

The adhesive is applied directly from the static mix tube or mix cup onto side one of the appropriate substrate. A small amount of 30 mil glass beads are then sprinkled onto the adhesive before mating the second side with enough pressure to squeeze out excess adhesive and ensure the beads touch both sides of the substrate.

Cross Peel Test. The cross peel test involves overlaping a pair of 2.5 cm by 7.6 cm coupons to form a cross with the adhesive between the overlap. The sample is then seated in a two sided pre-heated fixture for a specific time and then pulled apart while still hot. This test yields a relative comparison of the adhesive strength vs. time and thus the relative state of adhesive cure (see SAE-J2553).

Lap Shear Test. The lap shear test requires overlapping the last 2.5 cm of a pair of 10 by 2.5 cm coupons to create a 17.8 cm long sample with adhesive and 30 mil glass spacer beads between the overlap. This sample then is placed between a two sided fixture preheated to 127° C. for a specific time and then removed and cooled to 22° C. The sample then may be tested or subjected to a post bake process of 30 minutes at 149° C. and then may be followed by a post bake of 30 minutes at 204° C. to model SMC powder prime or topcoat cure requirements. The sample is then returned to 22° C. at which time it may be tested or further heated or cooled and tested at alternate temperatures to model practical in use applications. Typical evaluation temperatures include −34° C., −30° C., 22° C., 82° C., and 121° C. The lap shear test is conducted according to ASTM D3163 with a crosshead speed of 1.27 cm per minute.

Side Impact Test. The side impact test is performed on a lap shear sample by mounting it horizontally in a fixture and impacting it with a pendulum fitted with a weighted hammer head as called out in the General Motors GM9751P adhesive testing specification.

Open Time Test. The open time is determined by extruding out a one-half inch wide and tall bead of freshly mixed adhesive approximately two feet long at 22° C. A timer is started as soon as the material is mixed. A small wooden stick is used to tap an untapped area of the bead until which time the stick no longer pulls wet adhesive from the surface.

Wedge Peel. The wedge peel test was performed according to ASTM D5041 and involves bonding together the last 5 cm of two 100×155 mm panels and then driving a 60 degree wedge into the opposite side to prey open the bond until failure.

Example 1

Initial work bonding the new class of toughened SMC using commercially available PLIOGRIP® 5000A/5020B epoxy yielded a mixed failure mode consisting of fiber tear (FT) and adhesive failure (Ad) in both wedge peel and lap shear at 22° and 82° C. Alternate experimental fast cure epoxies incorporating dihydric phenol, polyfunctional amines, and short chain polyols, such as EXP-116C/31B subject U.S. Ser. No. 11/6539,539 and incorporated herein, were evaluated producing good fiber tear in lap shear at 22° and 82° C., but adhesive failure in wedge peel over toughened SMC. These examples demonstrate the need for enhanced adhesion to this new class of toughened SMC while maintaining a faster rate of strength build than the existing commercial two-part epoxy, see Table 1 below.

TABLE 1

|  | 22 C. Lap Shear (kPa) | 82 C. Lap Shear (kPa) | Wedge Peel (kg) |
| --- | --- | --- | --- |
| PG5000A/5020B | 2710 90FT 10Ad | 2010 90FT 10Ad | 17 Ad |
| EXP-116C/31B | 2110 FT | 2050 FT | 10 27FT 73Ad |

Example 2

MB7122-142-2 is EXP-116C/31B modified with the addition of 8 weight percent of hollow glass spheres, based on the total weight of the formula, and evaluated over toughened SMC. The percent fiber tear was observed to go down over all tests evaluated, 22° C. and 82° C. lap shear and 22° C. wedge peel. MB7122-160B4 removed catechol and the filler package from the formula and observed an improvement in wedge peel fiber tear. MB7122-116-3 utilized tri(dimethyl aminomethyl)phenol, a tertiary amine, and polyamide as primary curatives along with hollow glass spheres, without multifunctional aliphatic amine or catechol and observed positive results in wedge peel fiber tear and 82° C. lap shear. The observation that tertiary amine and aliphatic amine enhanced fiber tear in wedge peel over toughened SMC and the presence of catechol reduced it led to a design of experiments, DOE, to optimize chemistry vs. performance. Formulas and data are shown in Table 2 below; all samples were cured for 90 seconds at 127° C. plus 30 minutes at 149° C.

TABLE 2

| | Identification 7122- | | |
| --- | --- | --- | --- |
| | 142-2 | 160B4 | 116-3 |
| Epon 828 | 48.3 | 48.3 | 48.3 |
| Epon 58006 | 9.9 | 9.9 | 9.9 |
| Heloxy 505 | 3.9 | 3.9 | 3.9 |
| Q-Cell | 6.2 | — | — |
| TS-720 | 2.8 | 2.8 | 2.8 |
| ROS Talc | — | 13.8 | 13.8 |
| SPM CaCO3 | — | 20.3 | 21.3 |
| Glycerin | 1.0 | 1.0 | — |
| K54 | — | — | 5.2 |
| V140 | 11.8 | 16.7 | 30.0 |
| ATBNx42 | 11.8 | 12.1 | 13.5 |
| TETA | 7.2 | 8.2 | — |
| Catechol | 3.0 | — | — |
| Q-Cell | 1.6 | — | 1.3 |
| 5A Sieves | — | — | 1.4 |
| RCS Talc | — | — | 13.7 |
| TS-720 | 1.6 | — | 1.6 |
| Wedge Peel Failure Pattern | Ad | 70% FTAd | 60% FTCo |
| 82 C. Lap Shear, psi | Co | 50FTAd | FT |

Example 3

MB7122-179: A $2^3$ factorial designed experiment, DOE, with center points was run for the curative side using p, s-aliphatic and aromatic tertiary amines and hollow glass bubble concentrations as independent variables while the polyamide, liquid rubber, filler package, short chain polyol, and epoxy resin side were held constant. The formulas for this design of experiment are shown below in Table 3 and 4. The ratio of A to B was held constant at 1.6:1.0 parts by weight. The cure was 90 seconds at 127° C. and optionally post baked for 30 minutes at 149° C. Ninety second cure hot cross peel at 127° C., wedge peel, 82° C. lap shear and −30° C. side impact tests were conducted on each formula with the results being shown in Table 5 below.

TABLE 3

Epoxy A Side 7122-39A

| Ingredient, ID | Concentration (wt-%) |
|---|---|
| Epon 828 | 48.3 |
| Epon 58006 | 9.9 |
| Heloxy 505 | 3.9 |
| RCS Talc | 13.8 |
| SPM CaCO$_3$ | 20.3 |
| TS-720 | 2.8 |
| Glycerin | 1.0 |

TABLE 4

Curative B Side

ID 7122

| | 179-1 | 179-2 | 179-3 | 179-4 | 179-5 | 179-6 | 179-7 | 179-8 | 179-9 |
|---|---|---|---|---|---|---|---|---|---|
| K54 | 8.0 | 16.0 | 16.0 | 16.0 | 8.0 | 8.0 | 8.0 | 12.0 | 16.0 |
| TETA | 13.0 | 13.0 | 0 | 0 | 0 | 0 | 13.0 | 6.5 | 13.0 |
| 350A | 46.0 | 46.0 | 46.0 | 46.0 | 46.0 | 46.0 | 46.0 | 46.0 | 46.0 |
| ATBNx42 | 20.5 | 20.5 | 20.5 | 20.5 | 20.5 | 20.5 | 20.5 | 20.5 | 20.5 |
| Q Cell | 2.0 | 2.0 | 0 | 2 | 2 | 0 | 0 | 1 | 0 |
| RCS Talc | 20.91 | 20.91 | 20.91 | 20.91 | 20.91 | 20.91 | 20.91 | 20.91 | 20.91 |
| 5A Sieves | 2.18 | 2.18 | 2.18 | 2.08 | 2.18 | 2.18 | 2.18 | 2.18 | 2.18 |
| TS-720 | 2.40 | 2.40 | 2.40 | 2.40 | 2.40 | 2.40 | 2.40 | 2.40 | 2.40 |

TABLE 5

Test Results

| ID | Wedge Peel, (% FT) | 90 Sec Hot Cross Peel, 127 C., (kg) | 82 C. Lap Shear, (kPa) | −30 C. Side Impact (% FT) |
|---|---|---|---|---|
| 7122-1 | 65 | 13.6 | 1650 | 45 |
| 7122-2 | 22 | 13.6 | 1214 | 40 |
| 7122-3 | 0 | 13.2 | 1353 | 25 |
| 7122-4 | 25 | 5.4 | 1478 | 20 |
| 7122-5 | 50 | 2.3 | 1894 | 37 |
| 7122-6 | 75 | 3.6 | 2158 | 50 |
| 7122-7 | 90 | 11.3 | 1089 | 40 |
| 7122-8 | 25 | 6.8 | 1734 | 45 |
| 7122-9 | 25 | 13.1 | 1464 | 30 |
| Ideal Values | 100% | Maximum | >1408 kPa | 100% |

Each data point represents an average of five samples. For the wedge peel, and −30° C. side impacts the reported values are given as percent fiber tear, while the hot cross peel results are recorded in pounds force. The 82° C. lap shear tests were all 100% fiber tear and therefore the values are listed in kPa.

Performing Yates' algorithm on the data set yields the one and two-way estimated effects generated moving from low to high concentrations of each variable, see Table 6 below. For wedge peel performance, the primary effect appears to be from the catalyst concentration; however, due to the large two-way interaction with filler, it cannot be analyzed separately. This interaction arises from a difference in catalyst sensitivity, as the filler concentration changes. The best performance is obtained with lower catalyst concentration, without filler and addition of aliphatic amine hardener. The primary singular effect for the hot cross peel test is the hardener, but it is also interacted with the filler and catalyst concentrations. While presence of hardener improves the rate of strength build, it has its greatest effect without the filler and at elevated catalyst levels. With the 82° C. lap shear testing, catalyst and hardener, catalyst and filler and hardener and filler show large two-way interactions and also must be interpreted as couples. The catalyst-hardener interaction indicates elevated performance at both low hardener and catalyst levels while the catalyst-filler and hardener-filler interaction both indicate maximum performance with filler. The −30° C. side impact test did not show large variations as the variables were altered; nonetheless, the single and two-way interactions were optimized at low catalyst, with both hardener and filler. Unfortunately the best case was still below the ideal value of 100 percent fiber tear. A summary of these observations is shown below in Table 7.

TABLE 6

| | Primary Effects | | | Two-Way Interactions | | |
|---|---|---|---|---|---|---|
| | Catalyst | Filler | Hardener | Catalyst × Filler | Catalyst × Hardener | Hardener × Filler |
| Wedge Peel | −52.0 | −7.0 | 13.0 | 18.0 | −2.0 | −7.0 |
| Hot Cross Peel | 8.0 | −3.5 | 15.0 | −4.5 | −6.0 | 6.5 |
| 82 C. Lap Shear | −46.0 | 6.25 | −52.75 | −15.25 | 41.75 | 16.25 |
| −30 C. Side Impact | −14.25 | −.75 | 5.75 | 3.25 | 6.75 | 8.25 |

These individual effects and two-way interactions support the need to have both the catalyst and hardener present along with the remaining constants of the formula such as polyamide, to optimize adhesion to toughened class A SMC in all but the 82° C. lap shear test where the best case was observed without the hardener. However, with the presence of aliphatic amine the positive benefits to the remaining tests evaluated, wedge peel, cross peel, and −30° C. side impact outweigh the incremental reduction in 82° C. lap shear and, thus, must remain a component of the technology. The hollow glass beads while integral to the performance of the 82° C. lap shear and −30C side impact tests, their marginal loss in performance without them is less than the loss in performance in the wedge and cross peel with them. As a result they were removed from this optimization.

TABLE 7

|  | Catalyst (Low or High) | Hardener (Yes or None) | Filler (Yes or None) |
|---|---|---|---|
| Wedge Test | Low | Yes | None |
| Hot Cross Peel | High | Yes | None |
| 82 C. Lap Shear | Low | None | Yes |
| −30 C. Side Impact | Low | Yes | Yes |

Example 4

MB7122-182-11 demonstrates a reduced level of polyamide enhanced the fiber tear of the wedge peel test over toughened class A SMC. 7122-182-12 further demonstrates the effect of reduced polyamide and changing the acrylonitrile content of the rubber used to manufacture the epoxy terminated ABA liquid rubber from 21.5 to 26 percent. MB7351-10-3/183-1 returns the acrylonitrile content to the original level however it changes the end cap from diglycidyl ether of bisphenol A to diglycidyl ether of cyclohexane dimethanol and adds Epon 834, a higher molecular weight epoxy. These latter modifications created 100% fiber tear in wedge peel, 82° C. lap shear and −30° C. side impact; formulas and data are shown in Table 8.

TABLE 8

| Ingredients | 7122-182-11 | 7122-182-12 | 7351-10-3/ 183-1 |
|---|---|---|---|
| Epon 828 | 82.8 | 82.8 | 81.53 |
| Epon 834 | 0 | 0 | 5.60 |
| Epon 58006 | 16.9 | 0 | 0 |
| Epon 58005 | 0 | 16.9 | 0 |
| Epon 58042 | 0 | 0 | 17.71 |
| Heloxy 505 | 6.8 | 6.8 | 0 |
| RSC Talc | 25.3 | 25.3 | 26.6 |
| SPM CaCO$_3$ | 34.8 | 34.8 | 36.6 |
| TS-720 | 4.7 | 4.7 | 3.16 |
| Glycerin | 1.7 | 1.7 | 1.8 |
| K54 | 6.2 | 7.0 | 7.8 |
| TETA | 10.1 | 11.4 | 12.6 |
| 350A | 17.9 | 20.1 | 22.3 |
| ATBNx42 | 15.9 | 17.9 | 19.9 |
| RSC Talc | 16.3 | 18.2 | 20.5 |
| 5A Sieves | 1.7 | 1.9 | 2.1 |
| TS-720 | 1.9 | 2.1 | 2.3 |
| Wedge Peel % FT | 100 | 100 | 100 |
| 82 C. Lap Shear % FT | 100 | 100 | 100 |
| −30 C. Side Impact % FT | 0 | 100 | 100 |
| 90 Sec 127 C. Hot Cross Peel, kg | 16.7 | 15.9 | 22.2 |

Example 5

The structural integrity of the 7351-10-3/183-1 formula shown in Table 8 above was evaluated by bonding electrocoated metal PC-590 to itself as well as CP346 toughened class A SMC to itself using a 90 second fixture cure at 127° C. followed by 30 minutes at 150° C. as requested by a potential customer. Data are shown in Tables 9 and 10, respectively. In both cases a complete General Motors GM3629 specification was completed. All results shown are considered passing with the requisite fiber tear, cohesive or e-coat failure patterns, as called out in the specification.

Example 6

All of the aforementioned formulas contained an aliphatic short chain polyol to enhance the rate of reaction. Table 11 shows the formulas and tabular data and FIG. 1 shows the plot of effects resulting from varying glycerin concentration on the cross peel strength at 127° C. in the presence of both aliphatic and aromatic tertiary amine. Relative to formula 7351-72-4 without glycerin the data supports enhancement in rate of strength build at 60, 90 and 120 seconds. Furthermore, relative to the commercial epoxies also shown in FIG. 1, PG5000 and PG5300 the experimental formulas demonstrate a shift to a faster rate of strength build. Under these conditions the data shows a diminishing return where the maximum benefit observed at 3% is reduced at 5% glycerin.

TABLE 9

| PC 590/590 | 22 C. Lap Shear, MPa | Mode of Failure % Cohesive | 82 C. Lap Shear, MPa | Mode of Failure % Cohesive | (−40 C.) Lap Shear | Mode of Failure % Cohesive or Primer | (−40 C.) Side Impact, kg | Mode of Failure % Cohesive |
|---|---|---|---|---|---|---|---|---|
| 1 | 9.5 | 100 | 10.7 | 100 | 12.8 | 100 | 14.1 | 100 |
| 2 | 8.5 | 100 | 7.7 | 100 | 12.6 | 100 | 11.3 | 100 |
| 3 | 11.2 | 100 | 7.9 | 100 | 13.3 | 100 | 14.5 | 100 |
| 4 | 9.5 | 100 | 8.5 | 100 | 10.6 | 100 | 13.6 | 100 |
| 5 | 9.4 | 100 | 8.5 | 100 | 10.6 | 100 | 16.8 | 100 |
| Mean | 9.6 | 100 | 8.7 | 100 | 12.0 | 100 | 14.1 | 100 |

| [ ]PC 590/590 | 22 C. Side Impact, kg | Mode of Failure Cohesive | 7 day 54 C. Water Soak Test Wet, MPa | Mode of Failure % Cohesive Adhesive | 7 day 54 C. Water Soak Recovered MPa | Mode of Failure % Cohesive Adhesive | Wedge Peel Testing kg | Mode of Failure % Cohesive |
|---|---|---|---|---|---|---|---|---|
| 1 | 13.6 | 100 | 13.4 | 100 | 13.0 | 100 |  |  |
| 2 | 13.6 | 100 | 12.6 | 100 | 8.4 | 100 |  |  |
| 3 | 4.5 | 100 | 15.4 | 100 | 13.9 | 100 |  |  |
| 4 | 9.1 | 100 | 12.8 | 100 | 12.2 | 100 | 21.8 | 100 |
| 5 | 15.9 | 100 | 12.2 | 100 | 12.8 | 100 | 25.8 | 100 |
| Mean | 11.3 | 100 | 13.3 | 100 | 12.1 | 100 | 23.8 | 100 |

Figure 2:
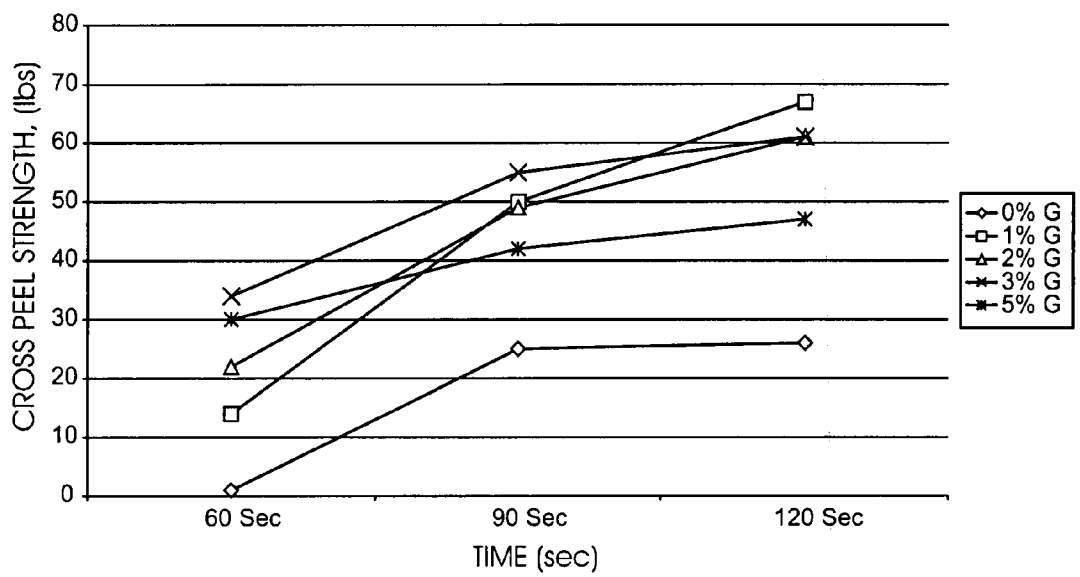
FIG. 2 displays the effects of short chain polyol, e.g., glycerin, concentration in the presence of an aliphatic amine, as reported in Example 6, by plotting cross peel strength versus time.

Table 12 and FIG. 2 show the formulas and effects of glycerin concentration without the tertiary amine. The results demonstrate a similar pattern as that with the tertiary amine increasing rate of strength build at 60, 90 and 120 seconds, as the concentration increases. It is further clear the maximum effect derived from the glycerin under these conditions is at or near to 3% showing the results at 5% to be less effective.

Figure 3:
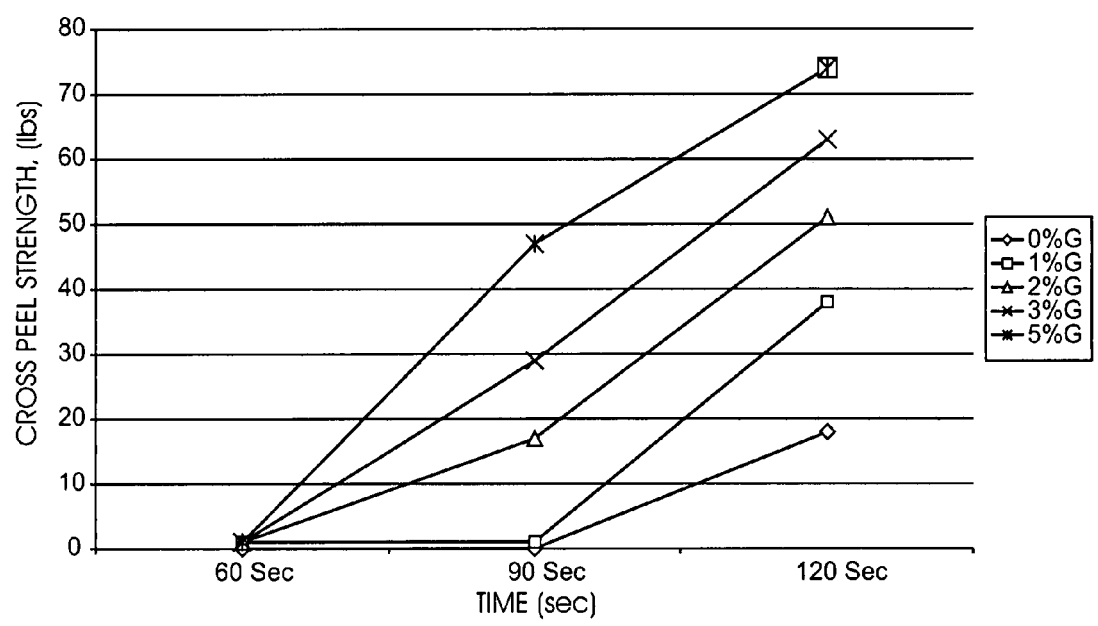
FIG. 3 displays the effects of short chain polyol concentration, e.g. glycerin, in the presence of an aromatic amine, as reported in Example 6, by plotting cross peel strength against time.

Table 13 and FIG. 3 reveal the formulas, data and plot of varying the glycerin concentration in the formula without aliphatic amine and its affect on cross peel strength build. There is little strength build enhancement at 60 seconds and good correlation with concentration at 90 and 120 seconds.

The combination of Tables 11, 12, and 13 supports the enhancement of strength build at 60 seconds is due primarily to the interaction of the aliphatic amine and glycerin on the epoxy molecule with little contribution from the tertiary amine.

The data presented herein demonstrates the usefulness of the invention. These formulas have excellent adhesion but not limited to toughened class A SMC as well as more traditional SMC and electro-coated metal. They demonstrate rapid strength build relative to commercial products and have low odor.

It has been demonstrated the need to combine polyamide, aliphatic amine, tertiary amine and short chain diol to obtain the proper mix of physical performance for strength build, wedge peel, 82° C. lap shear, −30° C. side impact and environmental durability.

TABLE 10

| 346/346 | 22 C. Lap Shear, kPa | Mode of Failure % Fiber Tear | 82 C. Lap Shear, kPa | Mode of Failure % Fiber Tear | (−40 C.) Lap Shear, kPa | Mode of Failure % Fiber Tear | (−40 C.) Side Impact kg | Mode of Failure Rebound or % FT |
|---|---|---|---|---|---|---|---|---|
| 1 | 3589 | 100 | 2942 | 100 | 4145 | 100 | 25 | 100 |
| 2 | 3341 | 100 | 3493 | 100 | 4485 | 100 | 25 | 100 |
| 3 | 3520 | 100 | 3328 | 100 | 5478 | 100 | 20.4 | 100 |
| 4 | 3644 | 100 | 2721 | 100 | 5030 | 100 | 27.2 | Rebound |
| 5 | 3289 | 100 | 3892 | 100 | 4650 | 100 | 27.2 | Rebound |
| Mean | 3537 | 100 | 3276 | 100 | 4761 | 100 | 25.0 | 100 |

| 346/346 | 22 C. Side Impact, kg | Mode of Failure % FT or Rebound | 7 Day 54 C. Water Soak Test Wet kPa | Mode of Failure % Fiber Tear | 7 Day 54 C. Water Soak Recovered, KPa | Mode of Failure % Fiber Tear | 22C. Wedge Testing, kg | Mode of Failure % Fiber tear |
|---|---|---|---|---|---|---|---|---|
| 1 | 27.2 | 100 | 3397 | 100 | 2839 | 100 | | |
| 2 | 27.7 | 100 | 3479 | 90 | 2742 | 100 | | |
| 3 | 27.7 | 100 | 2818 | 95 | 2708 | 100 | | |
| 4 | 27.7 | 100 | 3479 | 100 | 2418 | 100 | 18.1 | 100 |
| 5 | 27.7 | 100 | 3224 | 100 | 2893 | 100 | 15.9 | 100 |
| Mean | 27.7 | 100 | 3280 | 97 | 2720 | 100 | 17.0 | 100 |

TABLE 11

| Aliphatic and tertiary Amine | | | | | | |
|---|---|---|---|---|---|---|
| | 0% G + K54 7351-72-4 | .5% G + K54 72-6 | 1% G + K54 72-2 | 2% G + K54 72-8 | 3% G + K54 73-6 | 5% G + K54 73-8 |
| 260 F. Hot Cross Peel Vs. Glycerin Concentration Aliphatic and Tertiary Amine, 9420 SMC | | | | | | |
| Epon 834 | 3.1 | 3.1 | 3.1 | 3.1 | 3.1 | 3.1 |
| Epon 828 | 45.3 | 45.3 | 45.3 | 45.3 | 45.3 | 45.3 |
| Epon 58042 | 9.9 | 9.9 | 9.9 | 9.9 | 9.9 | 9.9 |
| RCS Talc | 14.8 | 14.8 | 14.8 | 14.8 | 14.8 | 14.8 |
| CaCO3 | 20.3 | 20.3 | 20.3 | 20.3 | 20.3 | 20.3 |
| TS-720 | 0.0 | 0.0 | 0.0 | 0.0 | 0.0 | 0.0 |
| Glycerine | 0.0 | 0.5 | 1.0 | 2.0 | 3.0 | 5.0 |
| K54 | 8.0 | 8.0 | 8.0 | 8.0 | 8.0 | 8.0 |
| TETA | 13.0 | 13.0 | 13.0 | 13.0 | 13.0 | 13.0 |
| 350A | 23.0 | 23.0 | 23.0 | 23.0 | 23.0 | 23.0 |
| ATBN x42 | 20.5 | 20.5 | 20.5 | 20.5 | 20.5 | 20.5 |
| RCS Talc | 21.0 | 21.0 | 21.0 | 21.0 | 21.0 | 21.0 |
| 5A Sieves | 2.2 | 2.2 | 2.2 | 2.2 | 2.2 | 2.2 |
| TS-720 | 2.4 | 2.4 | 2.4 | 2.4 | 2.4 | 2.4 |
| Cross Peel Performance at 127 C. | | | | | | |
| 60 Sec | 2 | 7 | 19 | 23 | 34 | 33 |
| 90 Sec | 41 | 38 | 49 | 52 | 55 | 53 |
| 120 Sec | 54 | 51 | 58 | 61 | 66 | 54 |

TABLE 12

No Tertiary Amine

|  | 0% G no K54<br>7353-72-3 | .5% G no K54<br>72-5 | 1% G no K54<br>72-1 | 2% G no K54<br>72-7 | 3% G no K54<br>73-5 | 5% G no K54<br>73-7 |
|---|---|---|---|---|---|---|
| 260 F. Hot Cross Peel Vs. Glycerin Concentration, No Tertiary Amine, 9420 SMC | | | | | | |
| Epon 834 | 3.1 | 3.1 | 3.1 | 3.1 | 3.1 | 3.1 |
| Epon 828 | 45.3 | 45.3 | 45.3 | 45.3 | 45.3 | 45.3 |
| Epon 58042 | 9.9 | 9.9 | 9.9 | 9.9 | 9.9 | 9.9 |
| RCS Talc | 14.8 | 14.8 | 14.8 | 14.8 | 14.8 | 14.8 |
| CaCO3 | 20.3 | 20.3 | 20.3 | 20.3 | 20.3 | 20.3 |
| TS-720 | 0.0 | 0.0 | 0.0 | 0.0 | 0.0 | 0.0 |
| Glycerine | 0.0 | 0.5 | 1.0 | 2.0 | 3.0 | 5.0 |
| K54 | 0.0 | 0.0 | 0.0 | 0.0 | 0.0 | 0.0 |
| TETA | 14.0 | 14.0 | 14.0 | 14.0 | 14.0 | 14.0 |
| 350A | 23.0 | 23.0 | 23.0 | 23.0 | 23.0 | 23.0 |
| ATBN x42 | 27.5 | 27.5 | 27.5 | 27.5 | 27.5 | 27.5 |
| RCS Talc | 22.0 | 22.0 | 22.0 | 22.0 | 22.0 | 22.0 |
| 5A Sieves | 2.2 | 2.2 | 2.2 | 2.2 | 2.2 | 2.2 |
| TS-720 | 2.4 | 2.4 | 2.4 | 2.4 | 2.4 | 2.4 |
| Cross Peel Performance at 127 C. | | | | | | |
| 60 Sec | 1 | 3 | 14 | 22 | 34 | 30 |
| 90 Sec | 25 | 30 | 50 | 49 | 55 | 42 |
| 120 Sec | 26 | 32 | 67 | 61 | 61 | 47 |

TABLE 13

No Aliphatic Amine

|  | 0% G<br>7353-74-2 | 1% G<br>74-1 | 2% G<br>74-4 | 3% G<br>74-5 | 5% G<br>74-6 | 10% G<br>74-8 |
|---|---|---|---|---|---|---|
| 260 F. Hot Cross Peel Vs. Glycerin Concentration, No Aliphatic Amine, 9420 SMC | | | | | | |
| Epon 834 | 3.1 | 3.1 | 3.1 | 3.1 | 3.1 | 3.1 |
| Epon 828 | 45.3 | 45.3 | 45.3 | 45.3 | 45.3 | 45.3 |
| Epon 58042 | 9.9 | 9.9 | 9.9 | 9.9 | 9.9 | 9.9 |
| RCS Talc | 14.8 | 14.8 | 14.8 | 14.8 | 14.8 | 14.8 |
| CaCO3 | 20.3 | 20.3 | 20.3 | 20.3 | 20.3 | 20.3 |
| TS-720 | 0.0 | 0.0 | 0.0 | 0.0 | 0.0 | 0.0 |
| Glycerine | 0.0 | 0.5 | 1.0 | 2.0 | 3.0 | 5.0 |
| K54 | 10.0 | 10.0 | 10.0 | 10.0 | 10.0 | 10.0 |
| TETA | 0.0 | 0.0 | 0.0 | 0.0 | 0.0 | 0.0 |
| 350A | 23.0 | 23.0 | 23.0 | 23.0 | 23.0 | 23.0 |
| ATBN x42 | 27.5 | 27.5 | 27.5 | 27.5 | 27.5 | 27.5 |
| RCS Talc | 22.0 | 22.0 | 22.0 | 22.0 | 22.0 | 22.0 |
| 5A Sieves | 2.2 | 2.2 | 2.2 | 2.2 | 2.2 | 2.2 |
| TS-720 | 2.4 | 2.4 | 2.4 | 2.4 | 2.4 | 2.4 |
| Cross Peel Performance at 127 C. | | | | | | |
| 60 Sec | 0 | 1 | 1 | 1 | 1 | 2 |
| 90 Sec | 0 | 1 | 17 | 29 | 47 | 48 |
| 120 Sec | 18 | 38 | 51 | 63 | 74 | 33 |

While the invention has been described with reference to various embodiments, those skilled in the art will understand that various changes may be made and equivalents may be substituted for elements thereof without departing from the scope and essence of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. In a two-component epoxy adhesive composition of an epoxy resin and an amine hardener, the improvement for enhancing reaction rate and adhesion to toughened SMC substrates, which comprises:
    (a) a resin pack comprising i) an epoxy compound reacted with butadiene-(meth)acrylonitrile copolymer having at least two groups which are reactive with epoxy groups and ii) short chain aliphatic polyol accelerating agent;
    (b) a curative pack comprising a polyamide, aliphatic amine, and a tertiary amine,
    wherein said curative pack includes amine terminated rubber.

2. The improved epoxy adhesive composition of claim 1, wherein said epoxy resin is one or more of polyglycidyl ethers of polyhydric polyols, polyglycidyl ethers of aliphatic and aromatic polycarboxylic acids, polyglycidyl ethers of polyphenols, epoxy resins modified with acrylate or urethane moieties, glycidylamine epoxy resins, or novolak resins.

3. The improved epoxy adhesive composition of claim 1, wherein said polyamide is a reaction of an aliphatic polyamine with one or more polymeric unsaturated higher fatty acids being one or more of a dimerized unsaturated higher fatty acid, an unsaturated trimerized higher fatty acid, or and their associated imidazolines.

4. The improved epoxy adhesive composition of claim 1, wherein said tertiary amines are one or more of pyridines, pyrazines, pyrimidines, purines, benzimidazoles, quinolines, imidazoles, or Mannich bases.

5. The improved epoxy adhesive composition of claim 3, wherein the Mannich bases are one or more of tris(dimethyl) aminoethylphenol, tris(dimethyl)aminomethyphenol, dimethylaminomethylphenol, 4,4'-dihydroxy-3,5,3', 5'-tetra (dimethylaminomethyl)-phenyl-dimethyl methane, or Mannich bases derived from a phenol having at least one tertiary amino group being one or more of dialkylamino, dihydroxyalkylamino, diarylamino, dihyroxyarylamino, piperidino, and morpholino groups, and a least one phenolic hydroxyl group.

6. The improved epoxy adhesive composition of claim 1, wherein said imidazoles are one or more of 2-ethyl-4-methyl imidazole, methyl imidazole, imidazole, 2,4-diamino-6(2'-methylimidazolyl-(1'))ethyl-S-triazine isocyanurate, 2,4-diamino-6(2'-methylimidazolyl-(1'))ethyl-S-triazine, or 2-heptadecylimidazole.

7. The improved epoxy adhesive composition of claim 1, wherein said curative pack includes one or more of ethylenediamine, diethylenetriamine, triethylenetetramine, tetraethylenepentamine, 2-methyl-1,5-pentanediamine, pentaethylenehexamine, hexamethylenediamine, trimethyl-1,6-hexanediamine, polyetherdiamine, diethylaminopropylamine, oleylamine, isophorone diamine, diethanolamine, triethanolamine, m-xylenediamine, diaminodiphenylsulfone, bis(aminopropyl)piperazine, or N-aminoethylpiperazine.

8. The epoxy adhesive composition of claim 1, wherein said polyol is one or more of ethylene glycol, 1,2-propylene glycol, 1,3-propylene glycol, glycerol, dipropylene glycol, tripropylene glycol, 2-methyl-1,3-propanediol, pentaerythritol, trimethylopropane, 1,4,6-octanetriol, butanediol, pentanediol, hexanediol, dodecanediol, octanediol, chioropentanediol, glycerol monoethyl ether, diethylene glycol, 2-ethylhexanediol, 1,4-cyclohexanediol, 1,2,6-hexanetriol, 1,3,5-hexanetriol, or 1,3-bis-(2-hydroxyethoxy)propane.

9. The improved epoxy adhesive composition of claim 1, wherein said butadiene-(meth)acrylonitrile copolymer is present in an amount of between about 5 and about 30 percent.

10. The improved epoxy adhesive composition of claim 1, which includes one or more of phosphine, polyamine, polyamidoamine, and polyamide catalysts and curing agents; particulate and reinforcing fillers and thixotropic agents, tinctorial pigments, opacifying pigments; or fillers.

11. The improved epoxy adhesive composition of claim 1, wherein said fillers include one or more of para-aramid, kaolin, talc, mica, clay, calcium carbonate, alkaline earth inorganic salt, metal, metal oxide, silica, hollow glass sphere, or ceramic bead.

12. The improved epoxy adhesive composition of claim 1, wherein said short chain aliphatic polyol comprises glycerin in an amount of between about 0.5 and about 9.9 percent.

* * * * *